(12) United States Patent
Adipuri et al.

(10) Patent No.: US 10,046,977 B2
(45) Date of Patent: Aug. 14, 2018

(54) PROCESS AND PLANT FOR PURIFYING RED MUD

(71) Applicant: Outotec (Finland) OY, Espoo (FI)

(72) Inventors: Andrew Adipuri, Frankfurt (DE); Edgar Gasafi, Karlsruhe (DE)

(73) Assignee: Outotec (Finland) Oy, Espoo (FI)

( * ) Notice: Subject to any disclaimer, the term of this patent is extended or adjusted under 35 U.S.C. 154(b) by 276 days.

(21) Appl. No.: 14/902,934

(22) PCT Filed: Jul. 5, 2013

(86) PCT No.: PCT/EP2013/064325
§ 371 (c)(1),
(2) Date: Jan. 5, 2016

(87) PCT Pub. No.: WO2015/000535
PCT Pub. Date: Jan. 8, 2015

(65) Prior Publication Data
US 2016/0152485 A1    Jun. 2, 2016

(51) Int. Cl.
| | |
|---|---|
| *C01F 7/06* | (2006.01) |
| *C01G 23/04* | (2006.01) |
| *C01G 49/06* | (2006.01) |
| *B01J 19/00* | (2006.01) |
| *C01G 23/053* | (2006.01) |

(52) U.S. Cl.
CPC .............. *C01F 7/066* (2013.01); *B01J 19/00* (2013.01); *C01G 23/04* (2013.01); *C01G 23/053* (2013.01); *C01G 49/06* (2013.01); *B01J 2219/0004* (2013.01)

(58) Field of Classification Search
CPC ...................................................... C01F 7/066
See application file for complete search history.

(56) References Cited

U.S. PATENT DOCUMENTS

| | | | |
|---|---|---|---|
| 2,790,712 A | * | 4/1957 | Henrichs ................... C21C 5/28 75/544 |
| 3,876,749 A | | 4/1975 | Horvath et al. |
| 2002/0061489 A1 | | 5/2002 | Gardner |
| 2009/0072538 A1 | | 3/2009 | Morin et al. |
| 2009/0311154 A1 | | 12/2009 | Jha et al. |

FOREIGN PATENT DOCUMENTS

| | | |
|---|---|---|
| CN | 101204681 A | 6/2008 |
| CN | 102174664 A | 9/2011 |
| GB | 1147241 A | 4/1969 |
| KR | 2004-0111000 A | 12/2004 |
| WO | 2013/040645 A1 | 3/2013 |

OTHER PUBLICATIONS

Notice of the Second Office Action prepared by the State Intellectual Property Office of the People's Republic of China for CN 201380078028.0, dated May 15, 2017, 13 pages.

(Continued)

*Primary Examiner* — Melissa Stalder Swain
(74) *Attorney, Agent, or Firm* — Chernoff Vilhauer LLP

(57) ABSTRACT

A process for purifying red mud including reduction of the red mud to reduced material, and traversing the reduced material with an oxygen-containing gas in the presence of a catalyst suitable for iron oxidation.

18 Claims, 1 Drawing Sheet

(56) References Cited

OTHER PUBLICATIONS

Kumar, Rakesh et al., "Utilization of Iron Values of Red Mud for Metallurgical Applications," Environmental and Waste Management, 1998, pp. 108-119.
Kumar, Sanjay et al., "Innovative Methodologies for the Utilisation of Wastes from Metallurgical and Allied Industries " Resources Conservation and Recycling, Apr. 18, 2006, vol. 48, pp. 301-314.
Piga, Luigi et al., "Recovering Metals from Red Mud Generated During Alumina Production," JOM, Nov. 1993, vol. 45, No. 11, pp. 54-59.
Sahu, Kamala Kanta et al., "An Overview on the Production of Pigment Grade Titania from Titania-rich Slag," Waste Management & Research, 2006, vol. 24, pp. 74-79.
Fisher, James et al., "Titanium Compounds, Inorganic," Kirk-Othrner Encyclopedia of Chemical Technology, John Wiles & Sons, Inc., 2001, pp. 1-58.
Kumar, R. et al. editors, "Phase Stability in the System $Fe_2O_3$—$Al_2O_3$—$Na_2CO_3$—C, and its Importance for the Processing of Red Mud," Metallurgy of Nonferrous and Rare Metals, 2002 pp. 137-153.
International Preliminary Report on Patentability, by the international Bureau of WIPO for PCT/EP2013/064325, dated Jan. 5, 2016, 8 pages.
Notice of Grounds for Rejection prepared by the Korean Intellectual Property Office for KR2016-7003208, dated Jun. 20, 2016, 8 pages.
PCT International Search Report prepared by the European Patent Office for PCT/EP2013/064325, dated Nov. 6, 2013, 4 pages.

\* cited by examiner

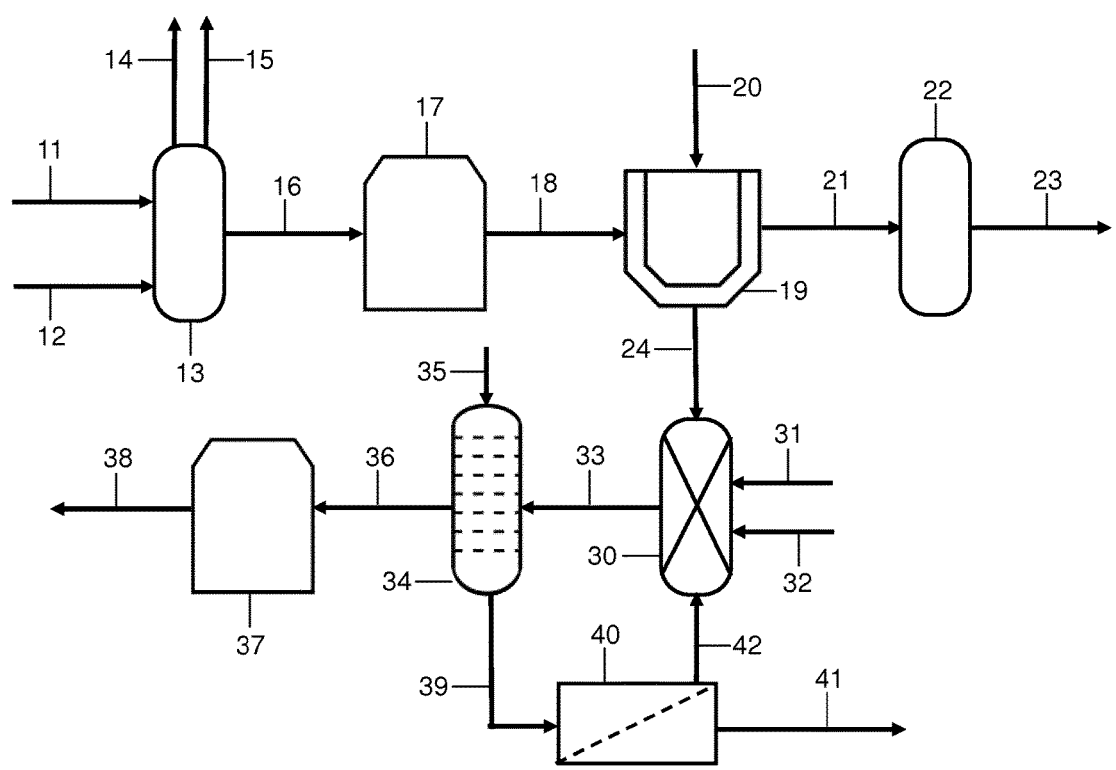

PROCESS AND PLANT FOR PURIFYING RED MUD

CROSS-REFERENCE TO RELATED APPLICATIONS

This is a national stage application filed under 35 USC 371 based on International Application No. PCT/EP2013/064325 filed Jul. 5, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Not applicable

BRIEF SUMMARY OF THE INVENTION

The present invention relates to a process for purifying red mud and to a plant for carrying out this process.

Red mud is a waste product of the production of aluminum from bauxite, an aluminum ore which chiefly is composed of the aluminum minerals gibbsite (hydrargillite, $\gamma$-Al(OH)$_3$), boehmite ($\gamma$-AlO(OH)), diaspore ($\alpha$-AlO(OH)) and furthermore the iron oxides hematite (Fe$_2$O$_3$) and goethite (FeO(OH)), the clay mineral kaolinite and small amounts of the titanium oxide anatase (TiO$_2$). The most important producer countries include Australia, China, Brazil, Guinea, Jamaica and India. From about 95% of the extracted bauxite aluminum is produced.

The production of aluminum from bauxite is effected according to the Bayer process developed by Carl Josef Bayer. This process makes use of the fact that the aluminum hydroxides contained in the finely ground bauxite can easily be dissolved in sodium hydroxide solution at elevated temperatures. The finely ground bauxite therefore is mixed with concentrated sodium hydroxide solution at elevated pressure (5 to 8 bar) and a temperature between 160 and 200° C. The following reaction takes place:

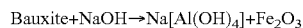
Bauxite+NaOH→Na[Al(OH)$_4$]+Fe$_2$O$_3$

There is obtained a sodium aluminate solution which contains undissolved residues. These residues, the so-called red mud, are separated for example by filtration. From the dilute aluminate lye, aluminum hydroxide then can be precipitated and be fired at temperatures above 1000° C. to obtain alumina.

Red mud chiefly consists of iron and titanium oxides as well as various silicic acid compounds and receives its characteristic red color by the contained iron(III) hydroxide. Depending on the quality of the bauxite used, between 1 and 1.6 t of red mud are obtained with high-value, e.g. tropical bauxite, and with European bauxite even 3.2 to 3.7 t of moist red mud are obtained per ton of aluminum produced. The resulting landfill costs amount to about 5% of the total costs of the aluminum production.

A closer look at the composition of the red mud reveals that the same consists of 20 to 65 wt-% of Fe$_2$O$_3$, 10 to 27 wt-% of Al$_2$O$_3$, 5 to 25 wt-% of TiO$_2$, 8 to 10 wt-% of CaO, 4 to 20 wt-% of SiO$_2$, 1 to 2 wt-% of MgO and 2 to 8 wt-% of Na$_2$O and is dependent on the mineralogical composition of the bauxite as well as individual process parameters of the Bayer process.

The highly alkaline mud previously has been dumped or discharged into rivers without further precautions, which has led to considerable burdens to the environment. Today, the mud generally is stored in sealed landfills, until the hydroxides and silicates present as dispersion largely have settled. The escaping sodium hydroxide solution is reused, the landfill is covered with sand and earth and recultivated. The short-term dangerousness of dumping red mud primarily is based on the high content of caustic sodium hydroxide solution. A long-term harmfulness results from the content of poisonous heavy metal, which is dependent on the origin and type of bauxite, wherein in particular the toxic components present as anions, such as fluorides, arsenates, chromates and vanadates, wash out from the mud.

The problem of the large amounts of red mud in the production of aluminum is revealed particularly clearly with the example of the so-called Kolontar catastrophe. On 4 Oct. 2009, as a result of a dam break near Kolontar, 700,000 to 1,000,000 m$^3$ of red mud escaped from the stores of an aluminum factory in the Hungarian village of Ayka and flooded an area of 40 km$^2$, among others several villages. Ten people died as a result of the mud flow, 150 people were injured.

Although the red mud is ecologically questionable, it also contains valuable products, in particular titanium compounds. Due to the currently practiced dumping of the red mud, these valuable products are not liable to any further utilization.

Until now, various technologies therefore have been examined, in order to obtain valuable materials from the red mud. Such technology is a reduction of dried red mud with subsequent recovery of the iron by a magnetic separator (cf. S. Kumar, R. Kumar, A. Bandopadhyasy, *Review innovative methodologies for the utilization of wastes from metallurgical and allied industries resources*, Conservation and Recycling, 48, 2006, pages 301 to 314).

What is also known from the literature is the melting of red mud in a suitable furnace (e.g. a blast-furnace shaft) without pre-reduction, whereby pig iron and aluminum clinker for the cement industry are obtained at 1600 to 1700° C. (cf. F. P. Piga, L. Stoppa *Recovering metals from red mud generated during alumina production*. JOM, 45(11), 1993, pages 55 to 59; R. Kumar, S. Srikanth, P. Ramachamdrarao, L. I. Leontiev, A, I. Kholkin, V. V. Belove, editors. *Phase stability in the Fe$_2$O$_3$—Al$_2$O$_3$—Na$_2$CO$_3$—C system and its implications in the processing of red mud*. Metallurgy of nonferrous and rare metals, 2002, pages 137 to 53; R. Kumar, J. P. Srivastava, J. P, Premchand. *Utilization of iron values of red mud for metallurgical applications*, in: Bandopadhyay A, Goswami N G, Ramachandrarao P, editors.

*Proceedings of the environmental and waste management in nonferrous metallurgical industries*, 1198, pages 108 to 119).

These two processes, however, have the disadvantage that a complete reduction of the metal components contained in the solid state just like melting only is effected at very high temperatures of more than 1500° C. and thus with the large amounts of red mud obtained very high amounts of energy are consumed. It is also problematic that due to the sodium vapors rising from the red mud at these temperatures, the reduction furnace can be damaged.

CN 102 174 664 A describes the reduction of the red mud in a rotary kiln, wherein coal is used as reducing agent and a lower process temperature between 1000 and 1550° C. is present. Due to the low reaction temperatures it cannot be ensured that a sufficient degree of reduction actually is achieved. Although this can be compensated by long retention times, this in turn lowers the economy of the process and in addition involves the risk of damages in the rotary kiln.

Therefore, it is the object of the invention to provide a process and a plant for carrying out this process, with which the waste quantities obtained in the aluminum production can be decreased in an economically expedient way and at least parts of the red mud can be recovered as valuable products.

In accordance with the invention, this object is solved by a method disclosed herein. In a first step, the red mud is at least partly reduced, whereby a reduced material is obtained. In a second step, an oxygen-containing gas subsequently flows through (traverses) this reduced material in the presence of a suitable catalyst.

The reduction in step 1 is carried out at a temperature between 800 and 1500° C., preferably at 1000 to 1450° C., whereby the load of the reactor can be reduced. It is the object of the reduction step to reduce the obtained iron oxide to metallic iron, so that the same can be reacted further in the second step. Hydrogen, hydrocarbons (here preferably methane), carbon monoxide and/or coal are equally suitable as reducing agents. A mixture of the reducing agents also is conceivable, in particular when gaseous reducing agents are used. The choice of the suitable reducing agent above all is determined by the type of reactor used. With the example of the reducing agents hydrogen and CO, the reactions taking place within the reduction stage will be represented below, by which reactions the iron oxide each is reduced to elemental iron in three steps:

$Fe_2O_3 + H_2 \rightarrow Fe_3O_4 + H_2O$ $Fe_3O_4 + H_2 \rightarrow 3FeO + H_2O$ $FeO + H_2 \rightarrow Fe + H_2O$ or $3Fe_3O_2 + CO \rightarrow 2Fe_3O_4 + CO_2$ $Fe_3O_4 + CO \rightarrow 3FeO + CO_2$ $FeO + CO \rightarrow Fe + CO_2$ The oxides silicon oxide, aluminum oxide and magnesium oxide still contained in larger amounts are stable at the applied reaction temperatures between 1000 and 1450° C. Contained titanium oxide partly is reduced to the Magneli phase; the resulting anosovite $Ti_3O_5$ is soluble in acid and can be converted into titanium dioxide ($TiO_2$) by means of the sulfate process, whereby a valuable product here is produced for the pigment market.

In the second process step, the reduced material is traversed by an oxygen-containing medium in the presence of a catalyst suitable for iron oxidation. Due to the reaction taking place, the previously reduced iron is oxidized with oxygen, whereby rust is formed according to the following reaction equation:

$4Fe + 3O_2 \rightarrow 2Fe_2O_3$

Subsequently, this iron oxide can easily be removed by washing out.

To achieve thorough mixing with the catalyst, it was found to be advantageous to add the same in the solid state and mix it with the reduced material before the traversal.

Preferably, the catalyst is an ammonium halide compound, with ammonium chloride being particularly suitable due to its low price. Furthermore, other amine compounds such as ethylenediammonium chloride can be used as a catalyst.

The catalyst, in this case the pure ammonium chloride $NH_4Cl$, is dissolved in a liquid medium, preferably water ($H_2O$).

Preferably, the ammonium chloride content in the mixture of reduced material and catalyst preferably is between 0.5 and 3 wt-%, more preferably 0.5 to 1 wt-% a nd particularly preferably about 1 wt-%, whereby a particularly high conversion is obtained with a high selectivity at the same time.

As oxygen-containing medium air preferably is used, which has the advantage that the same can directly be sucked in from the environment, the oxygen content is sufficient for the reaction, and at the same time the contained amount of oxygen does not lead to an excessive corrosion in the plant.

It was found to be particularly favorable to carry out the second process step at a temperature between 75 and 95° C., preferably at 80 to 90° C., and particularly preferably at about 85° C., with the oxygen-containing medium flowing into the reducing material with a flow rate of 2 to 20 Nl/min, preferably 5 to 10 Nl/min. The second stage features an aerator, where air is blown through the catalytic solution of $NH_4Cl$. Reduced red mud is then introduced into the aerator.

Furthermore, it as found to be positive when before the first process step (the reduction), the red mud is washed with washing water, whereby washed mud is obtained. Coarse impurities thereby can be removed; in particular calcium oxide and sodium oxide thus can be removed, in that their water-soluble hydroxides are formed:

$CaO + H_2O \rightarrow CaOH_2 \Delta G°_{50\ deg.c} = -50.826\ kJ$ $Na_2O + H_2O \rightarrow 2NaOH\ \Delta G°_{50\ deg.c} = -135.272\ kJ$ This has the advantage that contained alkalis already are removed at this point and later on will not load the downstream processes stages.

Preferably, the used washing water is taken from a water source without further pretreatment. This can be both water with usual drinking water quality and sea water, since the salts dissolved therein have no influence on the reactions taking place. An expensive water treatment therefore is not necessary.

In a preferred embodiment of the invention, washing water is used with a temperature between 30 and 60° C., preferably 40 to 50° C., since due to the slightly elevated temperature the washing operation can proceed with a higher conversion.

The addition of washing water is effected in an amount between 0.01 and 0.1 l($H_2O$)/kg(red mud), preferably 0.05 to 0.07 l($H_2O$)/kg(red mud), and particularly preferably 0.06 l($H_2O$)/kg(red mud), since this amount of water is sufficient to ensure an almost complete washing operation, and at the same time overdimensioning of the plant due to large streams of water is avoided.

The washing operation itself takes between 1 and 5 hours, in particular at the indicated washing water temperatures and quantities preferably 3 to 4 hours.

Above all when the red mud has been washed previously, it is expedient to subject the material to drying before the reduction and thus reduce the streams of material. This has the further advantage that within the reduction the additional amounts of energy for evaporating the contained water and an apparatus design which actually enables the discharge of so large steam quantities can be saved.

Drying particularly effectively takes place at temperatures between 80 and 130° C., preferably at 95 to 110° C., and particularly preferably at 100° C.

Furthermore, as mentioned already, a removal of the iron oxide obtained in step 2 (traversal with oxygen-containing gas) is possible in that the same is leached out, i.e. washed out with warm water. In principle, however, other separations, such as by a magnetic separator, are also possible comparatively easily, since the process according to the invention offers the advantage of distinctly reducing the product spectrum with which the metal oxides are contained in the red mud.

Leaching out the iron oxide from the aqueous phase has the advantage that subsequently the iron oxide can be separated from the used washing water by a solid-liquid separation and can be discharged in solid form as valuable product or also as waste. The liquid obtained from the solid-liquid separation can be supplied to process step 2 (traversal with oxygen-containing gas) to maintain a certain volume level at operation temperatures between 80 and 90° C. It is also possible to add fresh water, but by using the utilized recycle stream the overall water consumption is reduced.

In a final drying step, the solids left after leaching out the iron oxide are liberated from water residues still contained, so that the desired product mixture is obtained. The product mixture substantially contains silicon oxide ($SiO_2$), magnesium oxide (MgO), aluminum oxide ($Al_2O_3$) and titanium oxide ($TiO_2$) with traces of $Ti_3O_5$. Due to its comparatively high aluminum content between 40 and 60 wt-%, this powdery material can be admixed to the feed of a Bayer process.

Due to the likewise very high content of silicon dioxide of 20 to 40 wt-% and the generally inert material properties, the solids obtained can however also be used as solid heat carriers. Solid heat carriers are materials which behave stable up to 1000° C. and therefore are suitable as heat carriers for the pyrolysis of lignite, peat and oil sand or oil shale.

Finally, a recovery of the $TiO_2$ likewise present in quantities between 10 and 30 wt-% is possible in the rutile phase, in that this oxide is subjected to a further reduction. There is obtained $Ti^{3+}$, which is soluble in sulfuric acid and can be processed to $TiO_2$ pigments by the so-called sulfate process. By transferring the titanium oxide into low oxidation stages, the solubility in acid is improved (Fisher J, Egerton T A, Titanium Compounds Inorganic, Kirk-Othmer *Encyclopedia of Chemical Technology*, 2001; Sahu K. K, Alex C. T, Agrawal A. M. D, An overview on the production of pigment grade titania from titania-rich slag *Waste Manage* Res 24, 2006, pages 74 to 79). Due to the higher solubility of these titanium oxides, the required amount of sulfuric acid is decreased in the so-called sulfate process, whereby the amount of waste not only in the Bayer process, but also in the titanium oxide pigment production can be lowered.

With the present invention it is thus possible to produce an inert, less toxic and more environmentally friendly material from the alkaline red mud, which in addition is suitable both as solid heat carrier and for white pigment production.

The present invention furthermore also comprises a plant for the purification of red mud. This plant is particularly suitable for carrying out a process according to the disclosure herein. The plant includes an apparatus for the reduction of the red mud to reduced material and a downstream apparatus for traversing the reduced material with an oxygen-containing gas in the presence of a suitable catalyst.

Particularly preferably, the apparatus for the reduction and the apparatus for traversing the reduced material either is a fluidized-bed reactor or a rotary kiln. These two types of reactor have the advantage that here solids can be treated particularly well.

When a fluidized-bed reactor is used for the reduction, it is recommended to introduce a gaseous reducing agent, which is introduced e.g. together with the fluidizing gas or at least partly replaces said fluidizing gas, so that it is ensured that all particles in the fluidized bed get in contact with the reducing agent.

The use of a rotary kiln is particularly expedient when no drying or only a partial drying is provided before the reduction, since here the moisture content does not influence the mass transport within the reactor. To ensure a sufficient contact with the reducing agent, the use of a solid reducing agent, for example coal, is recommendable with this type of reactor.

In the aeration process, reduced red mud is agitated in a 1.0-1.5% w/w $NH_4Cl$-solution at an initial pH value of 6-7, while air is blown into the bottom of the aeration tank via a slotted sparge pipe and dispersed by a rotating impeller. Iron within the reduced red mud is dissolved and diffuses to the gain surface via the pore network. The presence of $NH_4Cl$ in the solution increases the conductivity of the liquor.

Precipitation of hydrated iron oxide takes place in the bulk of the aeration liquor. The exothermic heat of the reaction and the preheating of the $NH_4Cl$ liquor in a heat exchange produce an increase of the pulp's temperature to a maximum of 100° C., preferably below 85° C.

The aeration step is a batch operation. Each batch is made of 40 tons of reduced red mud. The solid to liquid ratio is in the range of 1:2. Aeration time for completion of metallic iron oxidation take normally 5-20 hours, preferably 10-13 hours depending upon the metallic iron content of the reduced red mud.

The air volume introduced into the aeration tank is approximately three times the stoichiometric amount required for oxidation of metallic iron (Fe(met)) to $Fe_2O_3$. Evaporation losses from the liquor are made-up by addition of process liquor. Each aeration batch consists of 3 sequences: filling, aeration, emptying.

Further developments, advantages and possible applications of the invention can also be taken from the following description of an exemplary embodiment and the drawing. All features described form the subject-matter of the invention per se or in any combination, independent of their inclusion in the claims or their back-reference.

BRIEF DESCRIPTION OF THE SEVERAL VIEWS OF THE DRAWINGS

In the drawing:

FIG. 1 shows the schematic structure of the plant according to the invention.

DETAILED DESCRIPTION OF THE INVENTION

In the plant according to FIG. 1, red mud is introduced into a washing apparatus 13 via a conduit 11. The washing agent, which preferably is water in drinking water quality or sea water, is introduced into the washing apparatus 13 via conduit 12. Via conduit 14 and conduit 15, the hydroxides $Ca(OH)_2$ and NaOH obtained due to washing are discharged together with the washing water.

The red mud washed is removed from the washing apparatus 13 via conduit 16 and from there gets into a drying apparatus 17. It is dried there at temperatures between 95 and 105° C., preferably until the material is present in powder form.

Via conduit 18, this powdery material subsequently is introduced into a reduction apparatus 19. Via conduit 20, the reduction apparatus 19 is charged with a reducing agent, which can be hydrogen, hydrocarbons, carbon monoxide or coal. The state of matter of the reducing agent depends on the type of reactor used. In a preferred aspect, there is used a rotary kiln with a solid reducing agent or a fluidized-bed reactor with a gaseous reducing agent.

As a result of the reduction waste gases are obtained, which via conduit 21 can be guided into a waste gas treatment 22 and after their treatment can be blown off from there into the surroundings via conduit 23.

After passing through these pretreatment stages, the reduced material is supplied to the actual chemical treatment via conduit 24. Said chemical treatment is effected in a reactor 30, into which on the one hand a suitable catalyst, particularly preferably ammonium chloride ($NH_4Cl$), is introduced via conduit 31 and an oxygen-containing medium, preferably air, is introduced via conduit 32. In that the reduced material is traversed by the oxygen-containing gas, a selective oxidation of the contained iron to $Fe_2O_3$ occurs in the presence of the catalyst.

The material 33 treated in this way subsequently is supplied to a wet separation 34. Via conduit 35, a washing agent, preferably water, is introduced into the same. This leads to a leaching out of the contained rust, which in the liquid phase is transferred into a solid-liquid separation 40 via conduit 39. The solid iron oxide separated there is discharged from the process via conduit 41 and either can be supplied to a further value chain or be dumped as environmentally harmless garbage. Via conduit 42, the liquid obtained is fed back into the aeration reactor 30.

Via conduit 36, the remaining solid products are discharged from the wet separation 34. These products are dried in the drying apparatus 37, preferably likewise at temperatures between 90 and 110° C., before the finished product is discharged via conduit 38. The finished product can be used as feed for a Bayer process, for producing titanium oxide pigments or as solid heat carrier (SHC).

EXAMPLE

Pretreatment

Red mud with a composition of 50 wt-% $Fe_2O_3$, 11 wt-% CaO, 10 wt-% $SiO_2$, 16 wt-% $Al_2O_3$, 2 wt-% MgO, 5 wt-% $Na_2O$ and 6 wt-% $TiO_2$ is washed with water or sea water at 40 to 50° C. for 3 hours, wherein calcium oxide (CaO) and sodium oxide ($Na_2O$) are transferred by reaction into the aqueous hydroxides $Ca(OH)_2$ and NaOH and are removed from the red mud together with the washing water.

Due to washing, the alkaline red mud is neutralized, since still contained $OH^-$ ions likewise are flushed out.

The contained solid material subsequently is dried for 6 hours at a temperature between 95 and 105° C.

The dried material then is reduced, wherein the reduction either is carried out in a fluidized-bed reactor with hydrogen ($H_2$), methane ($CH_4$) or carbon monoxide, or in a rotary kiln with coal (C) as reducing agent. The reaction temperature lies between 1000 and 1450° C., the mean retention time is 3 hours.

The contained oxides silicon oxide ($SiO_2$), aluminum oxide ($Al_2O_3$) and magnesium oxide (MgO) are stable and are not reduced at these temperatures At temperatures above 1200° C., the contained titanium oxide is reduced to $Ti_3O_5$ and $Ti_2O_3$. Almost 6 wt-% $TiO_2$ contained in the red mud is converted acid soluble oxides ($Ti_3O_5$ and $Ti_2O_3$) reduced to $Ti_3O_5$.

Chemical Treatment

In the actual chemical treatment, the material then is mixed with a catalyst, wherein the amount of the catalyst is approximately 1 wt-% of the total mixture of reduced material and catalyst. As catalyst, ammonium chloride is used.

This mixture then is aerated with air at temperatures of about 85° C., wherein the flow rate with which the air enters into the reactor lies between 5 and 10 Nl/min. The iron obtained in the reduction thereby is oxidized, i.e. the iron rusts.

This rust subsequently can easily be separated from the obtained solution. Separating is effected by leaching out with a washing liquid, preferably water. The product is obtained as solid. In the example given it contains 29.4 wt-% $SiO_2$, 47.1 wt-% $Al_2O_3$, 5.9 wt-% MgO and 17.6 wt-% $TiO_2$ with traces of $Ti_3O_5$. In principle, it is also possible to further process the iron oxide leached out and thus obtain it as valuable product.

Part of the remaining solids, namely $SiO_2$, $Al_2O_3$ and MgO, still are stable and are not reducible at temperatures between 1000 and 1450° C. In a further reduction, the contained titanium oxide partly can be converted into the Magneli phase, whereby $Ti_3O_5$ is obtained, which is very easily dissolved in acid. This means that this product is particularly suitable to be subjected to a further reduction, whereby the titanium compounds very easily can be processed to $TiO_2$ pigments in a sulfate process.

| List of Reference Numerals: | |
|---|---|
| 11-12 | conduit |
| 13 | washing apparatus |
| 14 | bedding |
| 17 | drying apparatus |
| 18 | reduction apparatus |
| 20, 21 | conduit |
| 22 | waste gas aftertreatment |
| 23, 24 | conduit |
| 30 | aeration reactor |
| 31-33 | conduit |
| 34 | washing apparatus |
| 35, 36 | conduit |
| 37 | drying apparatus |
| 38, 39 | conduit |
| 40 | solid-liquid separator |
| 41, 42 | conduit |

SEQUENCE LISTING

Not Applicable.

The invention claimed is:

1. A process for purifying red mud, comprising the following steps:
   1. reduction of the red mud to reduced material, and
   2. at a temperature between 75 and 95° C., traversing the reduced material with an oxygen-containing gas in the presence of a catalyst suitable for iron oxidation creating an at least partially oxidated product.

2. The process according to claim 1, characterized in that step 1 takes place under continuous or discontinuous addition of a reducing agent, which contains hydrogen, at least one hydrocarbon, carbon monoxide and/or coal.

3. The process according to claim 1, characterized in that step 1 is carried out at a temperature between 800 and 1500° C.

4. The process according to claim 1, characterized in that in step 2 an amine compound is used as catalyst.

5. The process according to claim 4, characterized in that in step 2 the amine compound content lies between 0.5 and 3 wt-% based on the total mass of the mixture of reduced material and catalyst.

6. The process according to claim 1, characterized in that air is used as oxygen-containing gas.

7. The process according to claim 1, characterized in that in step 2 the oxygen-containing gas flows into the reduced material with a flow rate of 2 to 20 Nl/min.

8. The process according to claim 1, characterized in that before step 1 the red mud is washed with washing water, whereby washed mud is obtained.

9. The process according to claim 8, characterized in that drinking water or sea water is used as washing water.

10. The process according to claim 8, characterized in that the washing water has a temperature between 30 and 60° C.

11. The process according to claim 8, characterized in that the washing water is added in a ratio of 0.01 to 0.1 l($H_2O$)/kg(red mud).

12. The process according to claim 8, characterized in that washing is effected for a period of 1 to 5 hour(s).

13. The process according to claim 1, characterized in that before step 1, the red mud is subjected to drying.

14. The process according to claim 13, characterized in that the drying is carried out at a temperature between 80 and 130° C.

15. The process according to claim 13, characterized in that iron oxide is leached out from the at least partially oxidize product.

16. The process according to claim 15, characterized in that the iron oxide leached out is removed by a solid-liquid separation.

17. The process according to claim 1, characterized in that in step 2, water, or optionally a recirculated aqueous solution liberated from dissolved substances, or both is added.

18. The process according to claim 1, characterized in that after step 2 a product mixture is dried.

* * * * *

UNITED STATES PATENT AND TRADEMARK OFFICE
CERTIFICATE OF CORRECTION

PATENT NO. : 10,046,977 B2
APPLICATION NO. : 14/902934
DATED : August 14, 2018
INVENTOR(S) : Andrew Adipuri Page 1 of 1

It is certified that error appears in the above-identified patent and that said Letters Patent is hereby corrected as shown below:

In the Specification

Column 4, Line 26      "…more preferably 0.5 to 1 wt-% a nd particularly…"
should be --more preferably 0.5 to 1 wt-% and particularly--

Column 4, Line 42      "Furthermore, it as found to be positive when before the first process…" should be --Furthermore, it has been found to be positive when before the first process--

Column 6, Line 46      "…iron oxidation take normally 5-20 hours,…" should be --iron oxidation takes normally 5-20 hours,--

In the Claims

Column 10, Line 20 (Claim 15) "…oxidize product." should be --oxidized product.--

Signed and Sealed this
Fourth Day of June, 2019

Andrei Iancu
*Director of the United States Patent and Trademark Office*